Dec. 16, 1958 W. L. HARDY 2,864,709
PACKAGED FOOD PRODUCT AND WRAPPER THEREFOR, WHICH PREVENTS
THE DESTRUCTION OF RIBOFLAVIN IN FOODS
Filed Nov. 15, 1954 4 Sheets-Sheet 1

INVENTOR
Walter L. Hardy
BY
ATTORNEYS

2,864,709

PACKAGED FOOD PRODUCT AND WRAPPER THEREFOR, WHICH PREVENTS THE DESTRUCTION OF RIBOFLAVIN IN FOODS

Walter L. Hardy, New York, N. Y., assignor to Waxed Paper Merchandising Council, Inc., Chicago, Ill., a corporation of Delaware Application November 15, 1954, Serial No. 468,710

10 Claims. (Cl. 99—171)

This invention relates to packaged edible food products containing riboflavin (vitamin $B_2$), including bakery products such as bread, rolls, and the like, in which the product is enclosed in a thin, flexible wrapping material which also acts as a screen to filter out a significant part of the light rays of certain wave lengths falling on the packaged product which otherwise would cause degradation of the riboflavin in the product. The invention also relates to the wrapper employed in such a package.

Riboflavin, also known as vitamin $B_2$, occurs naturally in wheat but is largely lost in the milling of the flour. It is almost universal practice to enrich bakery products by adding riboflavin to the flour from which the products are made. A typical riboflavin-enriched loaf of white bread weighing approximately 515 grams will have a riboflavin content of approximately 2.50 mg.

When riboflavin-enriched bakery products or other edible foods having a substantial riboflavin content are wrapped in conventional transparent or translucent wrapping materials, such as cellophane, polyethylene wrap, or waxed, titanium dioxide coated paper (known as "titanium wrap"), and the packaged product is exposed to visible light, either daylight or artifical light, more or less destruction of the riboflavin content occurs, the destruction being much more rapid when cellophane is used as a wrapper.

Riboflavin destruction appears to take place almost equally throughout a loaf of bread, and not just on the surface. A typical loaf of white bread wrapped in clear cellophane has been found to lose approximately 49% of its riboflavin content after exposure to diffused daylight for two days and 66% of such content after five days. A similar loaf of white bread wrapped in unprinted, waxed, titanium wrap has been found to lose approximately 21.5% of its riboflavin after exposure to diffused daylight for two days and 51.9% of its riboflavin after such exposure for five days.

I have found that, contrary to generally accepted opinion light in the visible portion of the spectrum has a much greater destructive effect on riboflavin in food products than ultraviolet light. Although riboflavin exhibits a high degree of absorption for radiant energy in four major zones in the ultraviolet and visible ranges, specifically at about 2250, 2690, 3720, and 4450 Angstrom units (A), I have found that slight degradation takes place in the ultraviolet region, that little or no degradation occurs at 3720 A., and that maximum degrdation occurs from light rays having wave lengths from 4200 A. to 4600 A., the wave length of about 4450 A. being most destructive.

A commercially desirable wrapper for edible food products, including bakery products such as bread, rolls, and the like, should be relatively thin and light and should be sufficiently flexible to conform readily to the product and tend to remain folded thereabout. For some uses the wrapper material should be virtually opaque to the eye, and the entire outer surface of the wrapper material preferably white to facilitate its being readily printed in color with the baker's or packer's trademark, name, or other ornamental, identifying and advertising matter. For other uses, it is sometimes desirable that the wrapper be transparent, with essentially no apparent color, so as to allow the packaged goods to be viewed through the wrapper in its natural colors. Where the wrapper is to contact the goods, as when no inner wrap is used, it is necessary that the inner surface of the wrapper have no harmful effect on such goods and that it be stable, so as not to rub off on the goods.

Following the teaching of the present invention, wrappers may be either generally opaque or transparent, have the above properties of a commercially desirable wrapper, be substantially or wholly unchanged in both inner and outer appearance from presently used wrappers of the same opaque or transparent type, and have the further property of substantially reducing the transmission therethrough of light in the wave-length range of from 4200 A. to 4600 A. Bakery goods made from flour enriched with riboflavin and other riboflavin-containing foods, when wrapped in the wrapping material of the invention, retain a higher percentage of their initial riboflavin content after exposure to either sunlight or artificial light than do similar products under the same conditions when enclosed in the prior art wrappers of the same general types.

In general, the wrapping material of the invention has, as a coating on the inner surface or the outer surface, on both surfaces of the web material, or as an additive material distributed through the web, a colorless or substantially colorless selective light screen which is effective in absorbing a significant percentage of incident light rays in the range of 4200 A. to 4600 A., having a lesser light transmission in this range than elsewhere in the range of visible light (3850 A. to 7600 A.). Such a light screen, together with the web material itself, excludes a material part of light in the deleterious range from the wrapped product without changing the appearance of the wrapper.

The opaque (to the eye) wrapper preferably has a white outer coating which is receptive of printing. In this embodiment the selective, colorless light screen may, if desired, be incorporated in the web itself, in the white outer coating thereon or in the inner or outer wax coating, or both without changing the appearance of the wrapper or its weight, folding or sealing ability.

The transparent wrapper may have the material forming the selective light screen incorporated therein as an additive material distributed through the web; as a separate coating on the inner surface or the outer surface, or both surfaces of the web, either directly or over other coatings, or may be included as a part of the usual moisture-proofing or thermoplastic coating for heat-sealing. As with the opaque wrapper, for maximum absorption of light rays in the range of wave lengths from 4200 A. to 4600 A. the material forming the selective light screen may be incorporated both in the body of the web and in the one or more coatings applied to the web.

Among the objects of the present invention is to provide an edible food product wrapped in a flexible wrapper capable of transmitting some visible light and incorporating an essentially colorless, transparent, selective light screen having its greatest light-screening ability in the wave lengths of light most destructive of riboflavin, the appearance of the wrapper being not substantially altered by incorporation of the selective light screen.

The above, and further objects of the invention relating to economies of use and manufacture will be more readily apparent in the following description of the invention.

In the drawings accompanying the specification and forming a part thereof:

Figure 4:
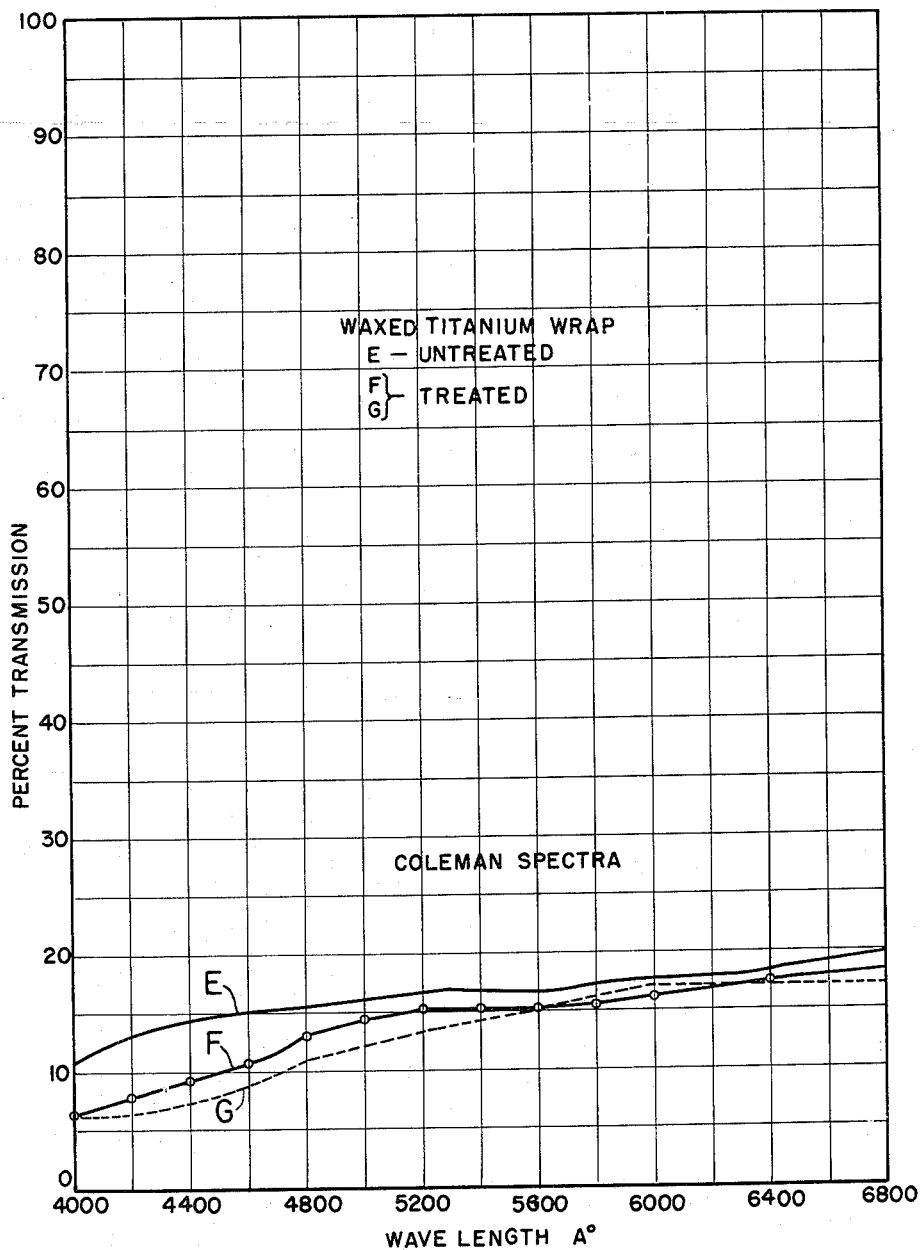

Fig. 4 is a graph illustrating the light transmission from 4000 A. to 6800 A. of (E) a typical commercial titanium dioxide-wax-coated paper, (F) a similar titanium dioxide-wax-coated paper, but with a transparent, colorless selective color screen incorporated therein in accordance with Example I, below and (G) a paper similar to that of curve (F) but incorporating a transparent, colorless selective color screen therein in accordance with modification No. 6 of Example I, below.

Figure 3:
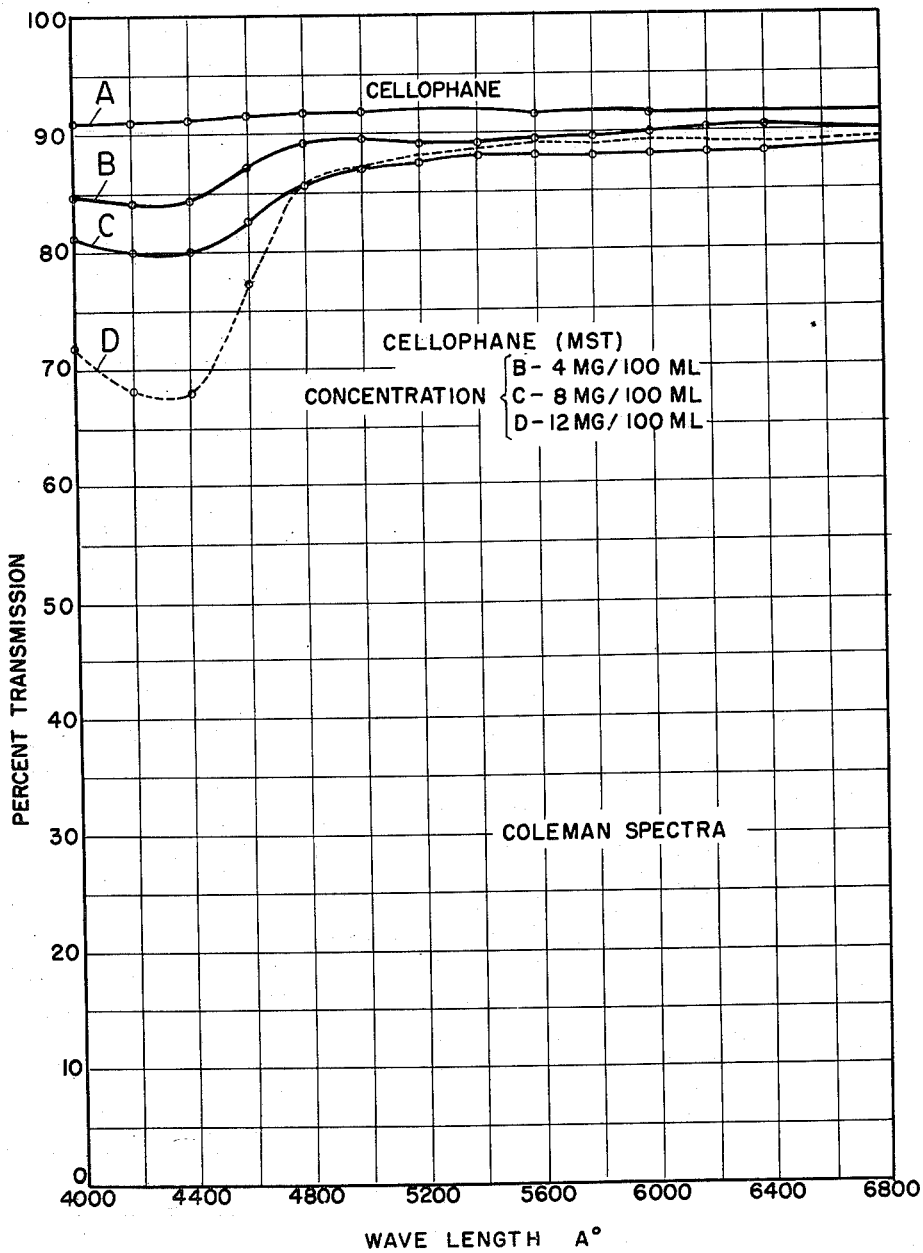

Fig. 3 is a graph illustrating (curve A) the light transmission from 4000 A. to 6800 A. of a typical commercial clear, transparent cellophane (regenerated cellulose) wrapper, and (curves B, C and D) a similar cellophane wrapper, but with a substantially colorless selective color screen-forming material incorporated in the coating on the web of each in different concentrations in accordance with Example II, below.

Figure 1:
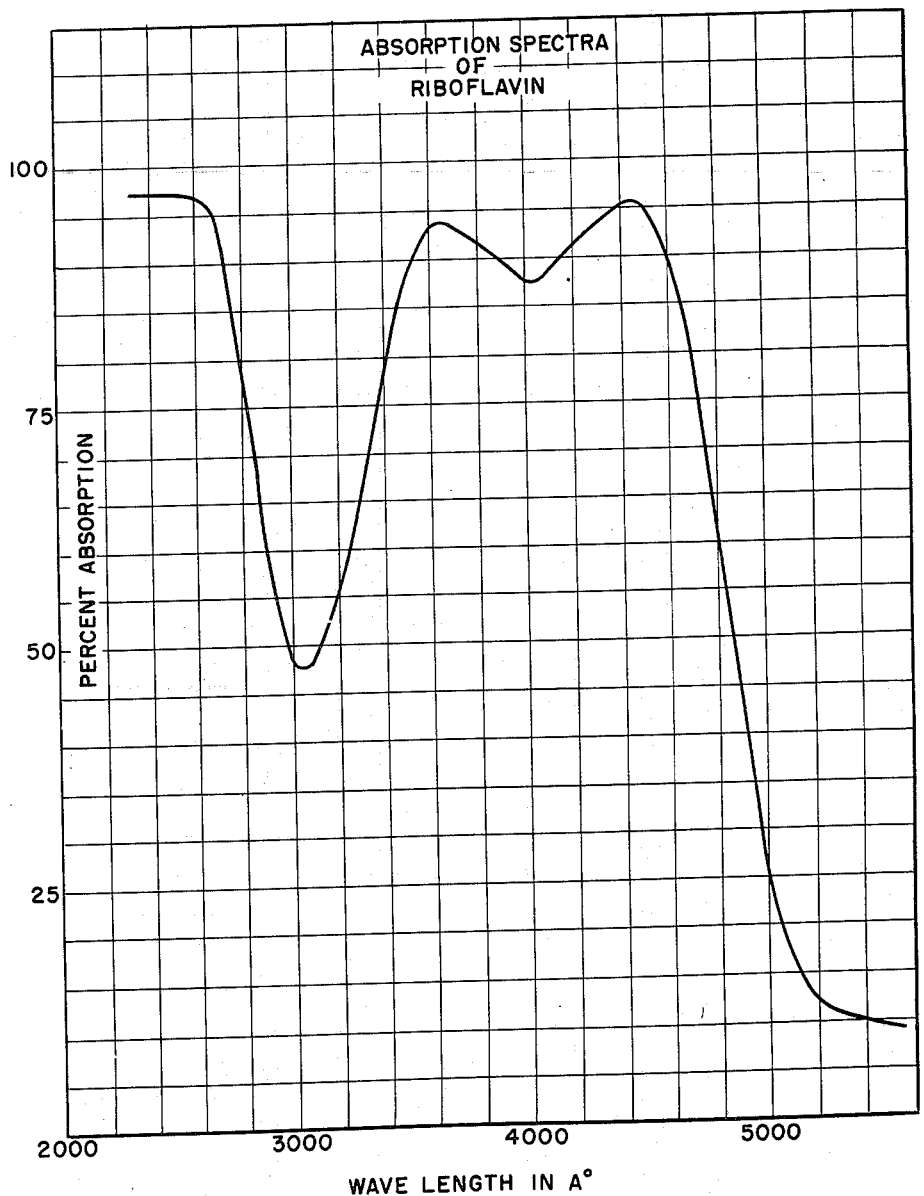
Fig. 1 is a graph indicating the light absorption spectrum of riboflavin in the range 2400 A. to 5600 A.
Figure 2:
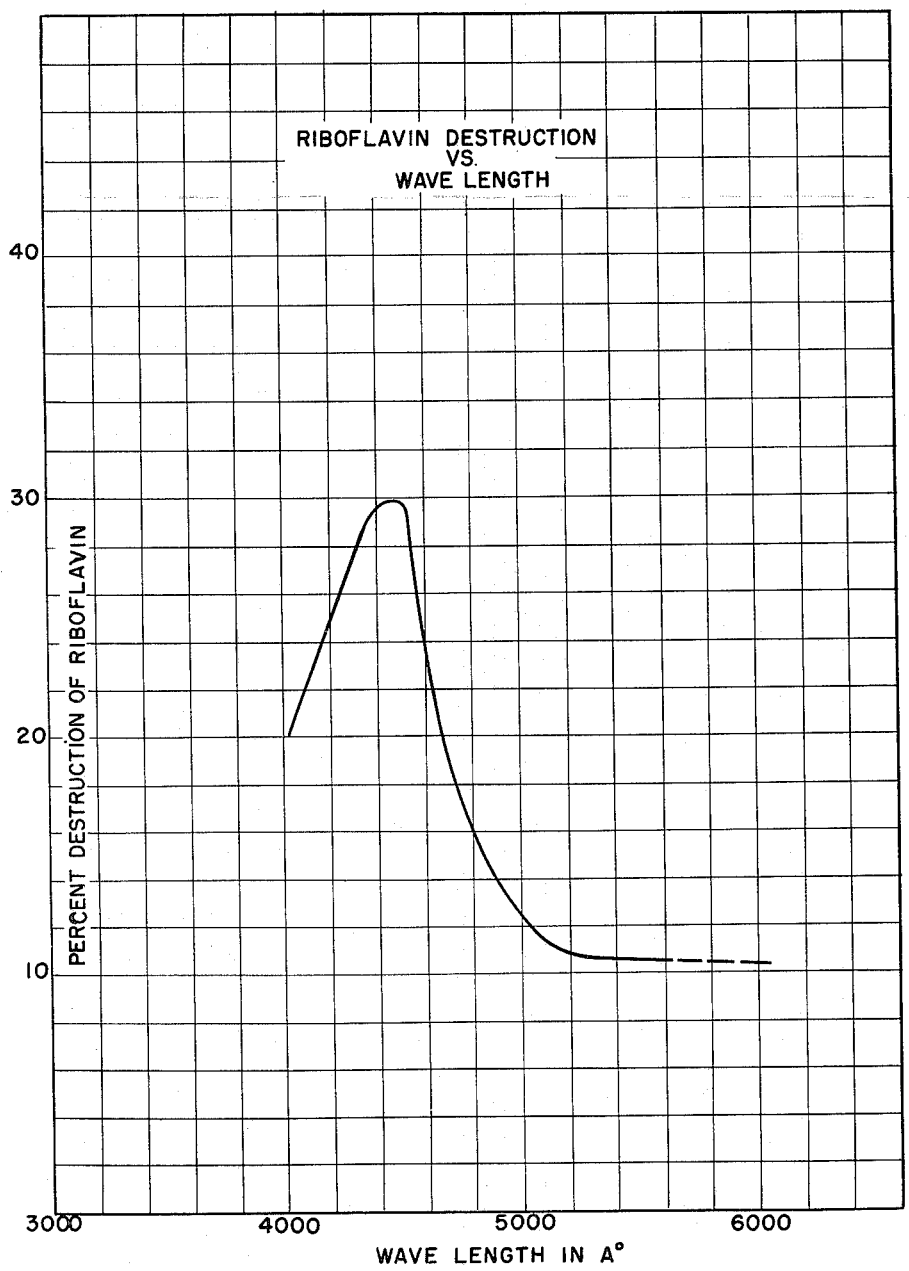
Fig. 2 is a graph indicating the relative destruction of riboflavin by incident light in the range of 4000 A. to 6000 A.

The zones of maximum light absorption of riboflavin within the range of 2250 A. to 5600 A. are shown in Fig. 1. Although the percentage of absorption of light by riboflavin in the range of 2250 A. to 2690 A. exceeds that at either 3720 A. and 4450 A., I have found that, contrary to usually accepted opinion, the degradation of riboflavin by light in the range of from 2000 A. to 6000 A. is comparatively negligible except in a narrow range generally centered about 4450 A. The destruction of riboflavin at this zone is strikingly shown in Fig. 2, wherein destruction or degradation of riboflavin by light in the range of from 4000 A. to 6000 A. is shown to be most rapid in the range from 4200 A. to 4600 A., the curve rising to a peak at 4450 A. There is no indication of any rapid destruction above 6000 A.

In accordance with one embodiment of my invention, I provide an initially translucent, thin, flexible, web material, such as paper, with a transparent selective light screen which absorbs a significant amount of the light rays in the range of 4200 A. to 4600 A. The presently preferred wrapper of this embodiment incorporates the light screen in the finally applied wax coatings on the inner and outer surfaces thereof. As above indicated, the screen may, however, be formed of material added to the paper stock in the making of the paper and thus distributed throughout the body of the web, or it may be incorporated in the coating on the outer surface of the web provides it with a dense white outer surface for receiving printing and for completely masking the color of the goods within the wrapper. Such outer white coating ordinarily consists predominantly of titanium dioxide.

The wrapper material of the first illustrative embodiment of the present invention is one in which the base web is conventional sulfite paper, wax-coated on both sides and titanium-coated on its outer surface but without printed matter thereon, the inner and outer wax coatings containing material forming the substantially colorless selective light screen. This wrapper has the property of excluding about 89% of light in the wave lengths between approximately 4200 A. and 4600 A. In certain forms of the first embodiment of the invention, the wrapper excludes as much as 92.5% of light at the wave length of 4450 A. and a minimum of 91.5% of light in the entire range of 4200 A. to 4600 A. Of course, printing increases the opacity of the wrapper and decreases transmission, depending largely on how much of the area of the wrapper is printed.

In the second embodiment of the invention, the wrapper is transparent and substantially colorless. As the base for such wrapper there is preferably employed a clear transparent web of regenerated cellulose (cellophane), the transparent, substantially colorless selective light screen being formed from material incorporated in the web or dispersed throughout coatings on one or both sides of the web. Such light screen or screens have the function of significantly reducing the amount of transmitted light in the wave lengths between approximately 4200 A. and 4600 A., thereby decreasing the rate of degration of riboflavin in the goods contained in the wrapper, while admitting substantial amounts of visible light of other wave lengths, so that the goods may readily be seen.

Presently preferred materials for forming the transparent selective light screen are multicyclic compounds, of which I prefer perylene ($C_{20}H_{12}$), 9-nitroanthracene ($C_{14}H_9NO_2$), certain mixtures of perylene and 9-nitroanthracene, naphthacene ($C_{18}H_{12}$), and certain mixtures of perylene and naphthacene. In addition to forming a transparent selective light screen, such materials and their indicated mixtures do not substantially affect the mechanical and visible qualities of the wrapper nor do they affect the contained food in the package should they contact it.

This invention will be more fully understood by consideration of specific examples of the manufacture of several embodiments of the wrapper of the invention.

*Example I*

This wrapper is a more or less translucent waxed paper which is white on the outside. The base material is a 22 pound per (24 x 36—500) ream, white, machine-glazed sheet made in the conventional manner on a Yankee-Fourdrinier paper machine which yields a finished sheet having a machine-glazed side and an unglazed side. The composition of the paper is as follows:

96% bleached chemical wood pulp
2% titanium dioxide
1% paper maker's alum
1% rosin size The sheet was coated on the unglazed side with a white coating of about four pounds per ream, using a conventional knife coater, and then drying the sheet on a steam heated cylinder. The white coating had the following composition:

250 lbs. water
578 lbs. titanium dioxide
2 lbs. tetra sodium pyrophosphate
50 lbs. corn sugar
75 lbs. corn starch
25 lbs. butadiene-polystyrene solids
360 lbs. water The white coating on the outer surface of the paper is receptive to printing, such as the baker's name, the name of the product, and various advertising or ornamental material. For the purpose of the tests set forth herein, the sheet was not printed, since, when wax-coated, it was used as the basis for the Coleman spectrographic test, the result of which are reproduced in curve F of Fig. 4. The curves of Figs. 3 and 4 are not extended past the 4600 A.–6800 A. range since the selective light screen materials used have a minimum light transmission within the visible range at about 4200 A.–4600 A.

The thus-coated sheet was then coated on both sides with a wax coating incorporating a selective light screen material, using a conventional dip-squeeze type of wax machine and solidifying the coating by passing the sheet through cold water. The coating had the following composition:

Wax coating:
2 to 8% polyethylene (molecular weight 15,000)
30 to 60% microcrystalline wax (ASTM penetration at 77° F. of 15.)
30 to 60% fully refined paraffin (ASTM melt point 135–37° F.)

Perylene was added in the ratio of .62 gram per liter of the above coating.

It will be seen by referring to curve F of Fig. 4 that in the above-described product of the first embodiment, even when not printed, there is a maximum reduction in transmission of light between 4200 A. and 4600 A. in the visible range, transmitting only 9.5% of light at the wave length of 4450 A., and transmitting a maximum of only slightly above 10% anywhere in this range. This is a marked improvement over the conventional double-wax-coated titanium wrapper, the Coleman spectrographic test of which is shown by curve E in Fig. 4. The conventional wrapper, formed of similar weight paper and similarly coated except for the absence of perylene in the wax coatings, transmits about 14.5% of light rays at 4450 A. Thus, the wrapper of the invention transmits 34½% less of light rays of such wave length than does the comparable conventional wrapper.

As indicated above, other multicyclic compounds and mixtures thereof may be employed to form the substantially colorless selective light screen incorporated in the wrapper. The light transmission properties in the wave length range of 4200 A. to 4600 A. of a wrapper similar to that of Example II below, but with the selective light screen formed of other multicyclic compounds, and mixtures thereof, in the wax coatings are given below. The coatings were composed of the same wax as in Example I, but with the different selective color screen-forming materials indicated dispersed therein.

| Selective light screen-forming material | Percent Light Transmission | | | |
| --- | --- | --- | --- | --- |
|  | 4,200 A. | 4,450 A. | 4,600 A. | 5,600 A. |
| 1. Naphthacene, 3 g./l | 9 | 10 | 10 | 16.5 |
| 2. 1,5 Dihydroxyanthraquinone, .67 g./l | 8.5 | 10 | 10.5 | 15 |
| 3. Perylene, .62 g./l., 9-nitroanthracene, .08 g./l | 6.5 | 8.5 | 10 | 17 |
| 4. Perylene, 1.07 g./l., naphthacene, .87 g./l | 7 | 8.5 | 9.5 | 15 |
| 5. Perylene, .48 g./l., Naphthacene, .48 g./l., 1,5 Dihydroxyanthraquinone, .77 g./l | 7 | 8.5 | 9.5 | 15 |
| 6. Perylene, .78 gms., Naphthacene, .6 gms., 1,5 Dihydroxyanthraquinone, .69 gm., 2-Aminoanthraquinone, 1.05 gms. in 1 liter of paraffin | 6.5 | 7.5 | 8.5 | 15 |
| 7. Perylene, .7 gms., Naphthacene, .54 gms., 9-Nitroanthracene, .36 gms., 1,5 Dihydroxyanthraquinone, .8 gms., 1-Aminoanthraquinone, .4 gms. in 1 liter of paraffin | 6.5 | 7.5 | 9 | 15 |
| 8. Perylene, .95 gms., Naphthacene, .6 gms. 1,5 Dihydroxyanthraquinone, .7 gms., Anthraquinone, 3.6 gms. in 1 liter of paraffin | 6.5 | 7.5 | 9 | 15 |

Curve G of Fig. 4 depicts the light transmission properties of the wrapper disclosed in the table above as modification number 6. It will be seen that such wrapper is outstanding in that the percentage of light transmission in the range of 4200 A. to 4600 A. at no time rises above 8.5. The curves of the other wrappers of Example I are generally similar, but each has a light transmission in such range which somewhat exceeds that of modification number 6. All of the wrappers of Example I show markedly less light transmission in the range of 4200 A. to 4600 A. than the conventional comparable wrapper of curve E of Fig. 4.

When used to package bakery goods and other riboflavin-containing foods, the wrappers of the first embodiment of the invention give improved results. When a food product packaged in accordance with the invention is exposed to light, the riboflavin in the food product is degraded much more slowly than the riboflavin in an identical food product wrapped in either cellophane or in the conventional double-coated waxed wrapper when subjected to the same conditions.

*Example II*

This wrapper is a transparent, substantially colorless material incorporating in either the base web material, in one or more coatings thereon, or in both, a substantially colorless selective light screen. In the first embodiment of Example II the web material is a conventional moistureproof, heat sealable, transparent cellophane (regenerated cellulose). Over the conventional thermoplastic coatings on the base, by which the material is rendered heat sealable, inner and outer coatings of perylene in a nitrocellulose vehicle are provided.

In Fig. 3, curve A, there is shown the light transmission graph (Coleman spectrograph) of colorless heat sealable transparent cellophane in the range of from 4000 A. to 6800 A. Within such range, curve A is almost a straight line, the percentage of transmitted light rising from 91% at 4000 A. to 92% at 6800 A. Curve B of Fig. 4 shows the light transmission properties of the same moistureproof heat sealable transparent cellophane coated on the inner and outer surfaces with perylene in clear nitrocellulose lacquer in the concentration of 4 mg. of perylene per 100 ml. of nitrocellulose lacquer. Curve C is a similar light transmission curve of a web of the same cellophane coated with a mixture of perylene and clear nitrocellulose lacquer in the concentration of 8 mg. per 100 ml., respectively. Curve D of Fig. 3 shows the light transmission properties of a similar cellophane coated with a mixture of perylene and clear nitrocellulose lacquer in the concentration of 12 mg. of perylene per 100 ml. of nitrocellulose lacquer.

It will be apparent from consideration of Fig. 3 that the wrapper materials of curves B, C, and D have a lesser transmission of light in the range of 4200 A. to 4600 A. than elsewhere within the visible range. The percentage of light rays in this range which are excluded by the wrapper increases with the concentration of perylene in the coating. At 4450 A. the conventional cellophane of curve A transmits 91.5% of the light falling thereon, whereas the material of curve D transmits only 69%. The wrapper of curve D transmits only 75% of the light transmitted by the wrapper of curve A at such wave length of light, or, in other words, the wrapper of curve D transmits 25% less light at 4450 A. than does the conventional cellophane. The material of curve D has a very slight greenish tinge. Such slight coloring of the wrapper is not displeasing, however, and, where a noticeable tint is not objectionable in the wrapper, a higher concentration of perylene in the coating or coatings may be employed with a further decrease in the percentage of light excluded at the wave length of 4450 A.

Although in Example II, the basic web material is clear cellophane, other materials normally transparent to visible light and substantially colorless may be employed in this embodiment of the wrapper. Thus, for example, the web material may be formed of polyethylene or glassine. Further, it will be apparent that the substantially colorless selective light screen may be formed from various other suitable materials, such as those set out in Example I and the disclosed modifications thereof.

I claim:

1. As an article of manufacture, a food product containing a substantial quantity of riboflavin and a wrapper enclosing the food product, said wrapper comprising: sulphite paper having an opaque coating consisting largely of titanium dioxide, and an overlying wax coating on at least one side of the wrapper, said coating being essentially transparent and incorporating a transparent, essentially colorless, selective light screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

2. As an article of manufacture, a food product containing a substantial quantity of riboflavin and a wrapper enclosing the food product, said wrapper comprising: sulphite paper having an opaque coating consisting largely of titanium dioxide, and an overlying wax coating on both sides of the wrapper, said coating being essentially transparent and incorporating a transparent, essentially colorless, selective light screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

3. As an article of manufacture, a bakery product containing a substantial quantity of riboflavin, and a wrapper enclosing the bakery product, said wrapper comprising: a sheet of paper having an opaque white layer consisting largely of titanium dioxide, and having an essentially colorless, transparent, selective light screen thereon, having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

4. As an article of manufacture, a food product containing a substantial quantity of riboflavin, and a wrapper enclosing the food product, said wrapper comprising: a flexible web having an essentially colorless, transparent, selective light screen thereon, the light screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

5. As an article of manufacture, a food product containing a substantial quantity of riboflavin, and a wrapper enclosing the food product, said wrapper comprising: a flexible web, including an essentially colorless, transparent, selective light screen, the light screen having the property of differentially absorbing light within the visible range, said screen lessening light transmission at least 4% of total incident light falling on the wrapper in the 4200 A. to 4600 A. range of light and having greater light transmission upward from 4600 A. to 6800 A.

6. As an article of manufacture, a bakery product containing a substantial quantity of riboflavin, and a wrapper enclosing the bakery product, said wrapper comprising a sheet of colorless, transparent regenerated cellulose having an essentially colorless, transparent, selective light screen thereon, the light screen having the property of differentially absorbing light within the visible range, said screen lessening light transmission at least 4% of total incident light falling on the wrapper in the 4200 A. to 4600 A. range of light and having greater light transmission upward from 4600 A. to 6800 A.

7. As an article of manufacture, a wrapper adapted for use on food products containing a substantial amount of riboflavin, said wrapper comprising: a flexible web, and an essentially colorless, transparent, selective light screen incorporated therewith, the light screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

8. As an article of manufacture, a wrapper adapted for use on food products containing a substantial amount of riboflavin, said wrapper comprising: a flexible, transparent, substantially colorless web, and an essentially colorless, transparent, selective light screen incorporated therewith, the light screen having the property of differentially absorbing light within the visible range, said screen lessening light transmission at least 4% of total incident light falling on the wrapper in the 4200 A. to 4600 A. range of light and having greater light transmission upward from 4600 A. to 6800 A.

9. As an article of manufacture, a wrapper adapted for use on food products containing a substantial amount of riboflavin, said wrapper comprising: a flexible, transparent, substantially colorless web, and an essentially colorless, transparent, selective light screen thereon, the light screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

10. As an article of manufacture, a food product containing a substantial quantity of riboflavin and a wrapper enclosing the food product, said wrapper comprising: sulphite paper having an opaque coating consisting largely of titanium dioxide, and an overlying wax coating on at least one side of the wrapper, said coating being essentially transparent and incorporating a transparent, selective light screen composed in large part of at least one multicyclic carbon compound, said screen having the property of differentially absorbing light within the visible range, said screen decreasing light transmission at least 4% of total incident light falling on the wrapper in the 4200 A. to 4600 A. range of light and having greater light transmission upward from 4600 A. to 6800 A.

References Cited in the file of this patent
UNITED STATES PATENTS

| | | |
|---|---|---|
| 2,042,501 | Buchanan et al. | June 2, 1936 |
| 2,286,307 | Replogle | June 16, 1942 |
| 2,600,093 | Coe | June 10, 1952 |
| 2,631,499 | Riley | Mar. 17, 1953 |

OTHER REFERENCES

J. Assoc. Offic. Agr. Chemists, vol. 32, pp. 797–801 (1949).

Food Research, vol. 16, pp. 360–4 (1951).